United States Patent
Okubo et al.

(10) Patent No.: US 11,566,124 B2
(45) Date of Patent: Jan. 31, 2023

(54) CROSSLINKED RUBBER COMPOSITION

(71) Applicant: BANDO CHEMICAL INDUSTRIES, LTD., Kobe (JP)

(72) Inventors: Takayuki Okubo, Kobe (JP); Masashi Kitatsuji, Kobe (JP); Takuya Mori, Tokai (JP); Taiichi Okada, Tokai (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 159 days.

(21) Appl. No.: 17/027,589

(22) Filed: Sep. 21, 2020

(65) Prior Publication Data

US 2021/0002466 A1  Jan. 7, 2021

Related U.S. Application Data

(63) Continuation of application No. PCT/JP2019/011828, filed on Mar. 20, 2019.

(30) Foreign Application Priority Data

Mar. 23, 2018  (JP) .............................. JP2018-056236

(51) Int. Cl.
*C08L 23/16* (2006.01)
*D01F 6/60* (2006.01)

(52) U.S. Cl.
CPC .............. *C08L 23/16* (2013.01); *D01F 6/605* (2013.01); *C08L 2205/025* (2013.01); *C08L 2205/035* (2013.01); *C08L 2205/16* (2013.01); *C08L 2312/00* (2013.01)

(58) Field of Classification Search
CPC .............................. C08L 2205/16; C08K 7/02
See application file for complete search history.

(56) References Cited

U.S. PATENT DOCUMENTS

| | | | | |
|---|---|---|---|---|
| 4,340,559 A * | 7/1982 | Yang | .................. | D01D 5/06 264/181 |
| 2014/0287862 A1 | 9/2014 | Yamada et al. | | |
| 2016/0040749 A1* | 2/2016 | Kageyama | ................ | F16G 5/10 474/8 |
| 2016/0208890 A1* | 7/2016 | Nonaka | .................... | C08J 3/203 |
| 2016/0262469 A1* | 9/2016 | Fernando | ................. | D04B 1/28 |
| 2017/0037933 A1 | 2/2017 | Takami et al. | | |
| 2019/0144708 A1* | 5/2019 | Leimer | ..................... | C23C 2/04 442/26 |
| 2020/0024429 A1* | 1/2020 | Nakashima | ........... | C08L 15/005 |

FOREIGN PATENT DOCUMENTS

| | | | |
|---|---|---|---|
| CN | 105924703 | * | 9/2016 |
| JP | 2001-165244 A | | 6/2001 |
| JP | 2005-200545 | | 7/2005 |
| JP | 2008-105847 | | 5/2008 |
| JP | 2008-190092 A | | 8/2008 |
| JP | 2011-88991 | | 5/2011 |
| JP | 2012-131919 | | 7/2012 |
| JP | 2012-219405 A | | 11/2012 |
| JP | 2013-18893 | | 1/2013 |
| JP | 2013-72024 A | | 4/2013 |
| JP | 2013-108564 | | 6/2013 |
| JP | 2013-167040 A | | 8/2013 |
| JP | 2014-209029 A | | 11/2014 |
| JP | 2015-143573 | | 8/2015 |
| JP | 2016-176160 A | | 10/2016 |
| JP | 2018-002849 A | | 1/2018 |
| JP | 2018-17398 | | 2/2018 |
| WO | 2015/159795 | | 10/2015 |
| WO | 2018/055850 A1 | | 3/2018 |

OTHER PUBLICATIONS

Gu, electronic translation of specification of CN 105924703, Sep. 2017.*
Gu, electronic translation of claims of CN 105924703, Sep. 2017.*
International Search Report dated May 21, 2019 as received in application No. PCT/JP2019/011828.

* cited by examiner

*Primary Examiner* — Jeffrey C Mullis
(74) *Attorney, Agent, or Firm* — Maschoff Brennan

(57) ABSTRACT

A crosslinked rubber composition contains a rubber component and para-aramid short fibers having a filament fineness of 2.5 dtex or more and dispersed in the rubber component.

7 Claims, No Drawings

CROSSLINKED RUBBER COMPOSITION

CROSS-REFERENCE TO RELATED APPLICATIONS

This is a continuation of International Application No. PCT/JP2019/011828 filed on Mar. 20, 2019, which claims priority to Japanese Patent Application No. 2018-056236 filed on Mar. 23, 2018. The entire disclosures of these applications are incorporated by reference herein.

BACKGROUND

The present invention relates to crosslinked rubber compositions.

Crosslinked rubber compositions containing para-aramid short fibers are used in various rubber products.

For example, Japanese Unexamined Patent Publication No. 2013-108564 discloses a transmission belt using a rubber composition containing para-aramid short fibers. Japanese Unexamined Patent Publication No. 2013-18893 discloses a tire using a rubber composition containing para-aramid short fibers. Japanese Unexamined Patent Publication No. 2005-200545 discloses a hose using a rubber composition containing para-aramid short fibers.

SUMMARY

The present invention is a crosslinked rubber composition containing a rubber component and para-aramid short fibers having a filament fineness of 2.5 dtex or more and dispersed in the rubber component.

DETAILED DESCRIPTION

An embodiment will be described in detail.

A crosslinked rubber composition according to the embodiment contains a rubber component and para-aramid short fibers having a filament fineness of 2.5 dtex or more. Hereinafter, the "para-aramid short fibers having a filament fineness of 2.5 dtex or more" are referred to as the "thick aramid short fibers."

Adding para-aramid short fibers to a crosslinked rubber composition improves the storage modulus of longitudinal elasticity under tension, but in addition, it is also desired to improve the storage modulus of longitudinal elasticity under compression. The crosslinked rubber composition according to the embodiment contains the para-aramid short fibers having a filament fineness of 2.5 dtex or more and therefore has a high storage modulus of longitudinal elasticity under compression. This is presumed to be because the thick aramid short fibers having a high filament fineness are less likely to fibrillate in the rubber component than conventional para-aramid short fibers having a filament fineness of 1.7 dtex and thus effectively exhibit their fiber performance.

Examples of the rubber component include ethylene-α-olefin elastomers, chloroprene rubber (CR), chlorosulfonated polyethylene rubber (CSM), hydrogenated acrylonitrile rubber (H-NBR), natural rubber (NR), isoprene rubber (IR), butadiene rubber (BR), styrene-butadiene rubber (SBR), nitrile rubber (NBR), and butyl rubber (IIR). The rubber component suitably includes one or more of these. For transmission belts, the rubber component suitably includes an ethylene-α-olefin elastomer, chloroprene rubber (CR), chlorosulfonated polyethylene rubber (CSM), or hydrogenated acrylonitrile rubber (H-NBR), and more suitably includes an ethylene-α-olefin elastomer.

Examples of the ethylene-α-olefin elastomer include ethylene propylene diene monomers (hereinafter referred to as "EPDM"), ethylene-propylene copolymers (EPM), ethylene-butene copolymers (EBM), and ethylene-octene copolymers (EOM). The ethylene-α-olefin elastomer suitably includes one or more of these. In terms of versatility, the ethylene-α-olefin elastomer more suitably includes EPDM.

The para-aramid short fibers that are the thick aramid short fibers may include polyparaphenylene terephthalamide short fibers (PPTA short fibers), may include copolyparaphenylene-3,4'-oxydiphenylene terephthalamide short fibers, or may include both of these. In order to obtain a high storage modulus of longitudinal elasticity under compression, the para-aramid short fibers that are the thick aramid short fibers suitably include at least polyparaphenylene terephthalamide short fibers (PPTA short fibers).

The thick aramid short fibers are dispersed in the rubber component. In order to obtain a high storage modulus of longitudinal elasticity under compression, the thick aramid short fibers may be oriented in one direction. In order to obtain a high storage modulus of longitudinal elasticity under compression, the content ($C_1$) of the thick aramid short fibers in the crosslinked rubber composition according to the embodiment is suitably 1 part by mass or more and 18 parts by mass or less, more suitably 3 parts by mass or more and 15 parts by mass or less, and even more suitably 5 parts by mass or more and 12 parts by mass or less per 100 parts by mass of the rubber component.

The filament fineness ($D_1$) of the thick aramid short fibers is 2.5 dtex or more. In order to obtain a high storage modulus of longitudinal elasticity under compression, the filament fineness ($D_1$) of the thick aramid short fibers is suitably 2.7 dtex or more, more suitably 3.0 dtex or more, and even more suitably 3.3 dtex or more, and is suitably 5.0 dtex or less. In order to obtain a high storage modulus of longitudinal elasticity under compression, the fiber length ($L_1$) of the thick aramid short fibers is suitably 0.5 mm or more and 10 mm or less, more suitably 1 mm or more and 5 mm or less, and even more suitably 2 mm or more and 4 mm or less.

In order to improve surface wear resistance, the crosslinked rubber composition according to the embodiment may further contain short fibers other than the thick aramid short fibers dispersed in the rubber component. Examples of the short fibers other than the thick aramid short fibers include nylon short fibers, vinylon short fibers, polyester short fibers, cellulose short fibers such as cotton, meta-aramid short fibers, and para-aramid short fibers having a filament fineness of less than 2.5 dtex. The short fibers other than the thick aramid short fibers suitably include one or more of these. In order to improve the surface wear resistance, the short fibers other than the thick aramid short fibers suitably include short fibers other than para-aramid short fibers, and more suitably include nylon short fibers.

In order to improve the surface wear resistance, the content ($C_2$) of the short fibers other than the thick aramid short fibers in the crosslinked rubber composition according to the embodiment is suitably 5 parts by mass or more and 30 parts by mass or less, and more suitably 10 parts by mass or more and 20 parts by mass or less per 100 parts by mass of the rubber component. In order to improve the surface wear resistance, the content ($C_2$) of the short fibers other than the thick aramid short fibers in the crosslinked rubber composition according to the embodiment is suitably higher than the content ($C_1$) of the thick aramid short fibers. In order to improve the surface wear resistance, the ratio ($C_2/C_1$) of the content ($C_2$) of the short fibers other than the thick aramid short fibers to the content ($C_1$) of the thick aramid short fibers is suitably 1.1 or more and 2.5 or less, and more suitably 1.5 or more and 2.0 or less.

In order to improve the surface wear resistance, the filament fineness ($D_2$) of the short fibers other than the thick aramid short fibers is suitably 3.0 dtex or more and 10 dtex or less, more suitably 5.0 dtex or more and 8.0 dtex or less. In order to improve the surface wear resistance, the filament fineness ($D_2$) of the short fibers other than the thick aramid short fibers is suitably larger than the filament fineness ($D_1$) of the thick aramid short fibers. In order to improve the surface wear resistance, the ratio ($D_2/D_1$) of the filament fineness ($D_2$) of the short fibers other than the thick aramid short fibers to the filament fineness ($D_1$) of the thick aramid short fibers is suitably 1.1 or more and 3.5 or less, and more suitably 2.0 or more and 3.0 or less.

In order to improve the surface wear resistance, the fiber length ($L_2$) of the short fibers other than the thick aramid short fibers is suitably 0.5 mm or more and 10 mm or less, more suitably 1 mm or more and 5 mm or less, and even more suitably 2 mm or more and 4 mm or less. In order to improve the surface wear resistance, the ratio ($L_2/L_1$) of the fiber length ($L_2$) of the short fibers other than the thick aramid short fibers to the fiber length ($L_1$) of the thick aramid short fibers is suitably 0.50 or more and 1.5 or less, and more suitably 0.80 or more and 1.2 or less. In order to improve the surface wear resistance, the fiber length ($L_2$) of the short fibers other than the thick aramid short fibers is suitably the same as the fiber length ($L_1$) of the thick aramid short fibers.

The rubber component in the crosslinked rubber composition according to the embodiment is a crosslinked rubber component. This rubber component may be any of a rubber component crosslinked using an organic peroxide as a crosslinking agent, a rubber component crosslinked using sulfur as a crosslinking agent, or a rubber component crosslinked using both an organic peroxide and sulfur as a crosslinking agent. In order to obtain a high storage modulus of longitudinal elasticity under compression, the rubber component is suitably a rubber component crosslinked using at least an organic peroxide as a crosslinking agent.

Examples of the organic peroxide include dicumyl peroxide, 1,3-bis(t-butylperoxyisopropyl)benzene, and 2,5-dimethyl-2,5-di(t-butylperoxy)hexane. The organic peroxide suitably contains one or more of these. In order to obtain a high storage modulus of longitudinal elasticity under compression, the organic peroxide suitably contains dicumyl peroxide. In order to obtain a high storage modulus of longitudinal elasticity under compression, the amount of organic peroxide in an uncrosslinked rubber composition before crosslinking is suitably 1 part by mass or more and 7 parts by mass or less, and more suitably 2 parts by mass or more and 5 parts by mass or less per 100 parts by mass of the rubber component.

In order to obtain a high storage modulus of longitudinal elasticity under compression, the rubber component in the crosslinked rubber composition according to the embodiment may be a rubber component crosslinked using also a co-crosslinking agent. Examples of the co-crosslinking agent include N,N'-m-phenylene bismaleimide, trimethylolpropane trimethacrylate, ethylene glycol dimethacrylate, triallyl isocyanurate, and liquid polybutadiene. It is suitable to use one or more of these as the co-crosslinking agent. In order to obtain a high storage modulus of longitudinal elasticity under compression, it is more suitable to use N,N'-m-phenylene bismaleimide as the co-crosslinking agent. In order to obtain a high storage modulus of longitudinal elasticity under compression, the amount of co-crosslinking agent in the uncrosslinked rubber composition before crosslinking is suitably 0.5 parts by mass or more and 7 parts by mass or less, and more suitably 2 parts by mass or more and 5 parts by mass or less per 100 parts by mass of the rubber component.

The crosslinked rubber composition according to the embodiment may further contain rubber compounding agents such as a reinforcing material like carbon black or silica, a functional filler, a softener, a vulcanization accelerator, a vulcanization acceleration aid, a processing aid, and an anti-aging agent, as necessary.

The crosslinked rubber composition according to the embodiment can be produced by kneading the rubber component and the rubber compounding agents including the thick aramid short fibers and the crosslinking agent in a rubber kneader to produce an uncrosslinked rubber composition and heating and pressing the uncrosslinked rubber composition by a processing method for rubber products to crosslink the rubber component. Examples of the rubber kneader include a closed kneader, a Banbury mixer, and an open roll mill.

The storage modulus of longitudinal elasticity under compression at 100° C. in the grain direction of the crosslinked rubber composition according to the embodiment is suitably 65.0 MPa or more, and more suitably 70.0 MPa or more. This storage modulus of longitudinal elasticity under compression (E') is measured in accordance with JIS K6265: 2001.

The storage modulus of longitudinal elasticity under tension at 100° C. in the grain direction of the crosslinked rubber composition according to the embodiment is suitably 255 MPa or more, and more suitably 265 MPa or more. This storage modulus of longitudinal elasticity under tension (E') is measured in accordance with JIS K6394:2007.

The ratio of the storage modulus of longitudinal elasticity under compression (E') to the storage modulus of longitudinal elasticity under tension (E') at 100° C. in the grain direction of the crosslinked rubber composition according to the embodiment is suitably 0.260 or more, and more suitably 0.270 or more.

The crosslinked rubber composition according to the embodiment is applicable to, e.g., rubber products such as transmission belts, tires, and hoses and is suitably applied particularly to transmission belts that undergo severe compressive deformation during use.

EXAMPLES

Crosslinked Rubber Compositions

Crosslinked rubber compositions of Examples 1 and 2 and Comparative Example were prepared. The configuration of each crosslinked rubber composition is also shown in Table 1.

Example 1

45 parts by mass of FEF carbon black (Seast SO made by TOKAI CARBON CO., LTD.) as a reinforcing material, 10 parts by mass of a powdered ultra-high molecular weight polyethylene resin (HI-ZEX MILLION 240S made by Mitsui Chemicals, Inc.) as a functional filler, 10 parts by mass of oil (SUNPAR 2280 made by JAPAN SUN OIL COMPANY, LTD.) as a softener, 5 parts by mass of zinc oxide (zinc oxide No. 3 made by SAKAI CHEMICAL INDUSTRY CO., LTD.) as a vulcanization acceleration aid, 1 part by mass of stearic acid (LUNAC made by Kao Corporation)

as a processing aid, 4 parts by mass of maleimide (VULNOC PM made by OUCHI SHINKO CHEMICAL INDUSTRIAL CO., LTD.) as a co-crosslinking agent, 7 parts by mass (active ingredient: 2.8 parts by mass) of an organic peroxide (PEROXYMON F-40 (purity: 40 mass %) made by NOF CORPORATION) as a crosslinking agent, 18 parts by mass of nylon short fibers (Leona 66 made by Asahi Kasei Corporation, filament fineness: 6.7 dtex, fiber length: 3 mm), and 10 parts by mass of thick PPTA short fibers having a filament fineness of 2.5 dtex (Kevlar made by DU PONT-TORAY CO., LTD., fiber length: 3 mm) were added per 100 parts by mass of a rubber component, and the mixture was kneaded to prepare an uncrosslinked rubber composition. The rubber component used was EPDM (JSR T7241 made by JSR Corporation). This uncrosslinked rubber composition was heated and pressed to produce a crosslinked rubber composition for compression test and tensile test. This crosslinked rubber composition was used as Example 1.

Example 2

A crosslinked rubber composition for compression test and tensile test was produced in a manner similar to that of Example 1 except that thick PPTA short fibers having a filament fineness of 3.3 dtex (Kevlar made by DU PONT-TORAY CO., LTD., fiber length: 3 mm) were used. This crosslinked rubber composition was used as Example 2.

Comparative Example

A crosslinked rubber composition for compression test and tensile test was produced in a manner similar to that of the Examples except that PPTA short fibers having a filament fineness of 1.7 dtex (Kevlar made by DU PONT-TORAY CO., LTD., fiber length: 3 mm) were used instead of the thick PPTA short fibers. This crosslinked rubber composition was used as Comparative Example.

Test Method

For each of the crosslinked rubber compositions of Examples 1 and 2 and Comparative Example, solid cylindrical test specimens whose axial direction was the grain direction were produced, and their storage moduli of longitudinal elasticity under compression (E') at 100° C. in the grain direction were measured in accordance with JIS K6265:2001 using a flexometer (FT-1200 made by Ueshima Seisakusho Co., Ltd.) at a test temperature of 100° C., a test static load of 250 N, a test dynamic load of 250 N, and a test frequency of 10 Hz. Strip-shaped test specimens whose longitudinal direction was the grain direction were also produced, and their storage moduli of longitudinal elasticity under tension (E') at 100° C. in the grain direction were measured in accordance with JIS K6394:2007 using a dynamic viscoelasticity tester at a test temperature of 100° C., a test dynamic strain of 0.1%, and a test frequency of 10 Hz. The ratio of the storage modulus of longitudinal elasticity under compression (E') to the storage modulus of longitudinal elasticity under tension (E') at 100° C. in the grain direction was then calculated.

Test Results

Table 1 shows the test results. The results in Table 1 show that both the storage modulus of longitudinal elasticity under compression (E') and the storage modulus of longitudinal elasticity under tension (E') at 100° C. in the grain direction are higher in Examples 1 and 2 using the thick PPTA short fibers than in Comparative Example, and the ratio of the storage modulus of longitudinal elasticity under compression (E') to the storage modulus of longitudinal elasticity under tension (E') at 100° C. in the grain direction is also higher in Examples 1 and 2 than in Comparative Example.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description

TABLE 1

|  |  | Examples | | Comparative |
|---|---|---|---|---|
|  |  | 1 | 2 | Example |
| Rubber Component | EPDM | 100 | 100 | 100 |
| Reinforcing Material | FEF Carbon Black | 45 | 45 | 45 |
| Functional Filler | Powdered Ultra-High Molecular Weight PE Resin | 10 | 10 | 10 |
| Softener | Oil | 10 | 10 | 10 |
| Vulcanization Acceleration Aid | Zinc Oxide | 5 | 5 | 5 |
| Processing Aid | Stearic Acid | 1 | 1 | 1 |
| Co-Crosslinking Agent | Maleimide | 4 | 4 | 4 |
| Crosslinking Agent | Organic Peroxide (Active Ingredient) | 7 (2.8) | 7 (2.8) | 7 (2.8) |
| Short Fibers | Nylon Short Fibers $C_2$ $D_2$ = 6.7 dtex, $L_2$ = 3 mm | 18 | 18 | 18 |
|  | PPTA Short Fibers $C_1$ $D_1$ = 2.5 dtex $L_1$ = 3 mm $D_1$ = 3.3 dtex | 10 | 10 |  |
|  | $D_1$ = 1.7 dtex |  |  | 10 |
| $C_2/C_1$ |  | 1.8 | 1.8 | 1.8 |
| $D_2/D_1$ |  | 2.7 | 2.0 | 3.9 |
| $L_2/L_1$ |  | 1.0 | 1.0 | 1.0 |
| Storage Modulus of Longitudinal Elasticity Under Compression E' at 100° C. in Grain Direction, MPa |  | 72.1 | 75.5 | 63.2 |
| Storage Modulus of Longitudinal Elasticity Under Tension E' at 100° C. in Grain Direction, MPa |  | 263 | 270 | 252 |
| Under Compression E'/Under Tension E' |  | 0.274 | 0.280 | 0.251 | should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The invention claimed is:

1. A transmission belt having a crosslinked rubber composition containing a rubber component and para-aramid short fibers having a fiber length of 0.5 mm or more and 10 mm or less, having a filament fineness of 2.5 dtex or more and 5.0 dtex or less, and dispersed in the rubber component.

2. The transmission belt having the crosslinked rubber composition according to claim 1, wherein
a ratio of a storage modulus of longitudinal elasticity under compression to a storage modulus of longitudinal elasticity under tension at 100° C. in a grain direction is 0.260 or more.

3. The transmission belt having the crosslinked rubber composition according to claim 1, further containing short fibers, other than the para-aramid short fibers, having a fiber length of 0.5 mm or more and 10 mm or less and dispersed in the rubber component.

4. The transmission belt having the crosslinked rubber composition according to claim 1, wherein
the rubber component includes an ethylene-α-olefin elastomer.

5. The transmission belt having the crosslinked rubber composition according to claim 1, wherein
the rubber component is a rubber component crosslinked using an organic peroxide as a crosslinking agent.

6. The transmission belt having the crosslinked rubber composition according to claim 1, wherein
the rubber component is a rubber component crosslinked using also a co-crosslinking agent.

7. The transmission belt having the crosslinked rubber composition according to claim 1, wherein
the para-aramid short fibers include polyparaphenylene terephthalamide short fibers.

* * * * *